United States Patent

Hsi-Chia

Patent Number: 6,032,765
Date of Patent: Mar. 7, 2000

[54] BRAKE CONTROL DEVICE FOR A WHEELED WALKER

[75] Inventor: Yang Hsi-Chia, Chang Hua, Taiwan

[73] Assignee: Larmine Manufacturing Corp., Chang Hua, Taiwan

[21] Appl. No.: 09/370,206

[22] Filed: Aug. 9, 1999

[51] Int. Cl.[7] .................................................. B62B 5/04
[52] U.S. Cl. ................ 188/19; 135/67; 74/489; 74/502.2; 188/2 D; 188/2 F; 280/87.041; 280/87.021
[58] Field of Search .......................... 74/488, 489, 501.6, 74/502.2; 188/19, 20, 22, 2 F, 2 D; 135/66, 67; 280/33.994, 87.01, 87.021, 87.041

[56] References Cited

U.S. PATENT DOCUMENTS

| | | | |
|---|---|---|---|
| 5,279,180 | 1/1994 | Henriksson | 74/502.2 |
| 5,664,460 | 9/1997 | Hewson | 74/502.2 |
| 5,865,065 | 2/1999 | Chiu | 74/502.2 |
| 5,878,625 | 3/1999 | Hu | 74/502.2 |
| 5,896,779 | 4/1999 | Biersteker et al. | 74/502.2 |
| 5,927,441 | 7/1999 | Luo | 188/19 |

*Primary Examiner*—Michael Mar
*Attorney, Agent, or Firm*—Harrison & Egbert

[57] ABSTRACT

A brake control device is mounted on a handle of a walking frame used by a lame or elderly person as an aid in walking. The device includes a seat fastened at one end thereof with the handle, and a control handlebar fastened at one end thereof with the seat. The seat is provided with a control arm and a stop member. The control arm is fastened with the control handlebar and is connected with one end of a brake cable. The control arm is actuated by the control handlebar to swivel so as to pull the brake cable to bring about the braking action which can be sustained without having to keep holding the control handlebar. The control handlebar is made stationary temporarily by a rolling rod which is forced into a retaining recess of the stop member for sustaining the braking action.

1 Claim, 6 Drawing Sheets

BRAKE CONTROL DEVICE FOR A
WHEELED WALKER

FIELD OF THE INVENTION

The present invention relates generally to a walking frame, and more particularly to a brake control device on a wheeled walker.

BACKGROUND OF THE INVENTION

As shown in FIG. 1, a walking frame of the prior art is designed for use by a lame or elderly person as an aid in walking. The walking frame is provided on a hand grip thereof with a brake lever 10 to facilitate the controlling of the brake device of the walking frame. Such a brake control device of the prior art is similar in principle to the brake control device on a bicycle.

When a person uses the prior art walking frame as a walking aid, he or she must hold the brake lever 10 continuously so as to be ready to slow down or stop the walking frame. However, it is rather tiresome and burdensome for a lame or elderly person to hold the brake lever 10 continuously. In addition, the brake wire is prone to rub against the locating seat 11 at such time when the brake lever 10 is activated. As a result, the brake wire is vulnerable to damage or severance.

SUMMARY OF THE INVENTION

The primary objective of the present invention is to provide a walking frame with a brake control device comprising a seat and a control handlebar fastened to the seat. The seat is provided with a control arm and a stop member. The control arm is fastened to the seat and is connected to the brake cable. The control arm is actuated by pivoting the control handlebar so as to pull the brake cable to bring about the braking action. The braking action can be sustained without having to keep holding the control handlebar since the control handlebar is made unmovable temporarily by a rolling rod which is forced into a retaining recess of the stop member.

The objective, features, functions, and advantages of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
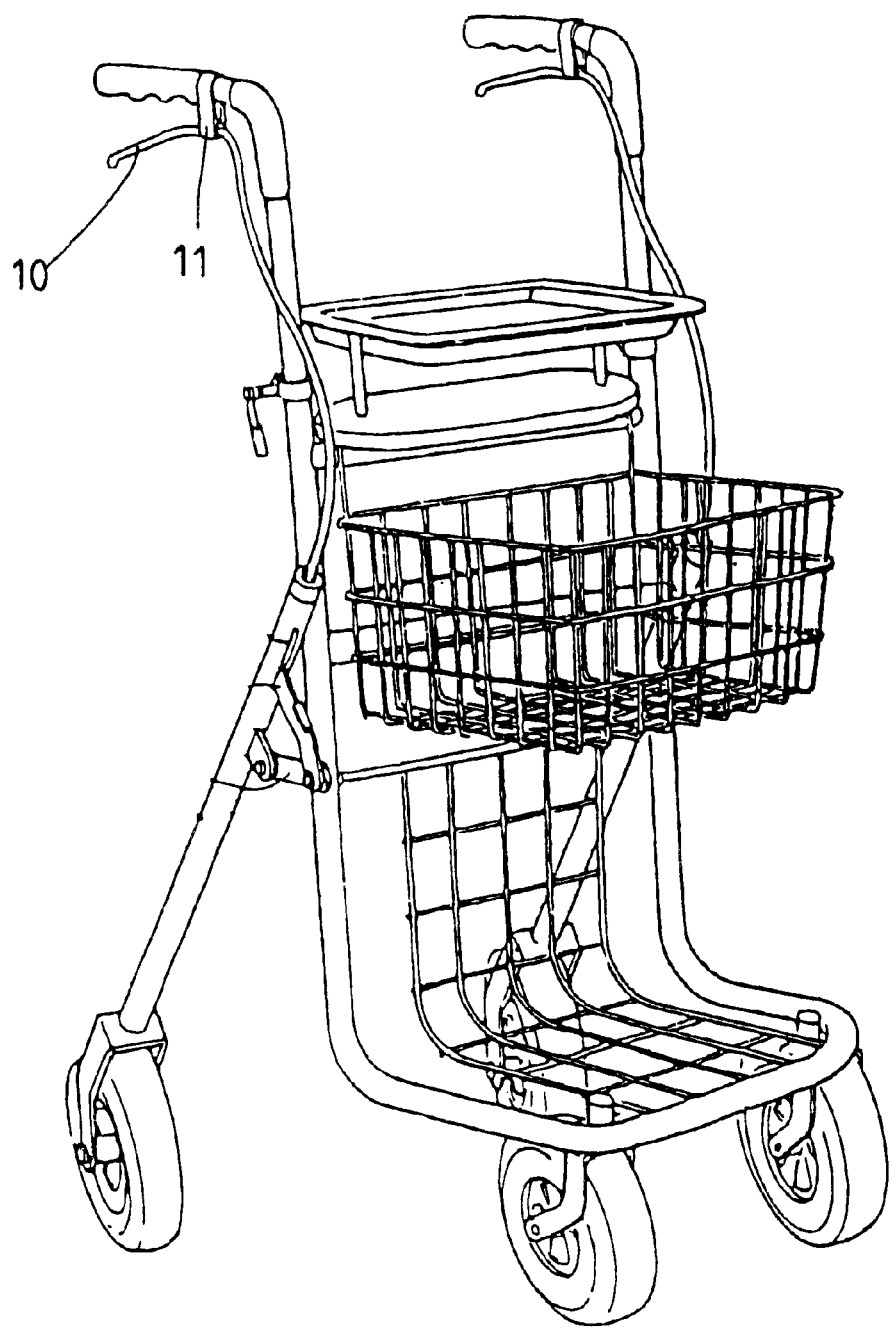
FIG. 1 shows a perspective view of a walking frame of the prior art.
Figure 2:
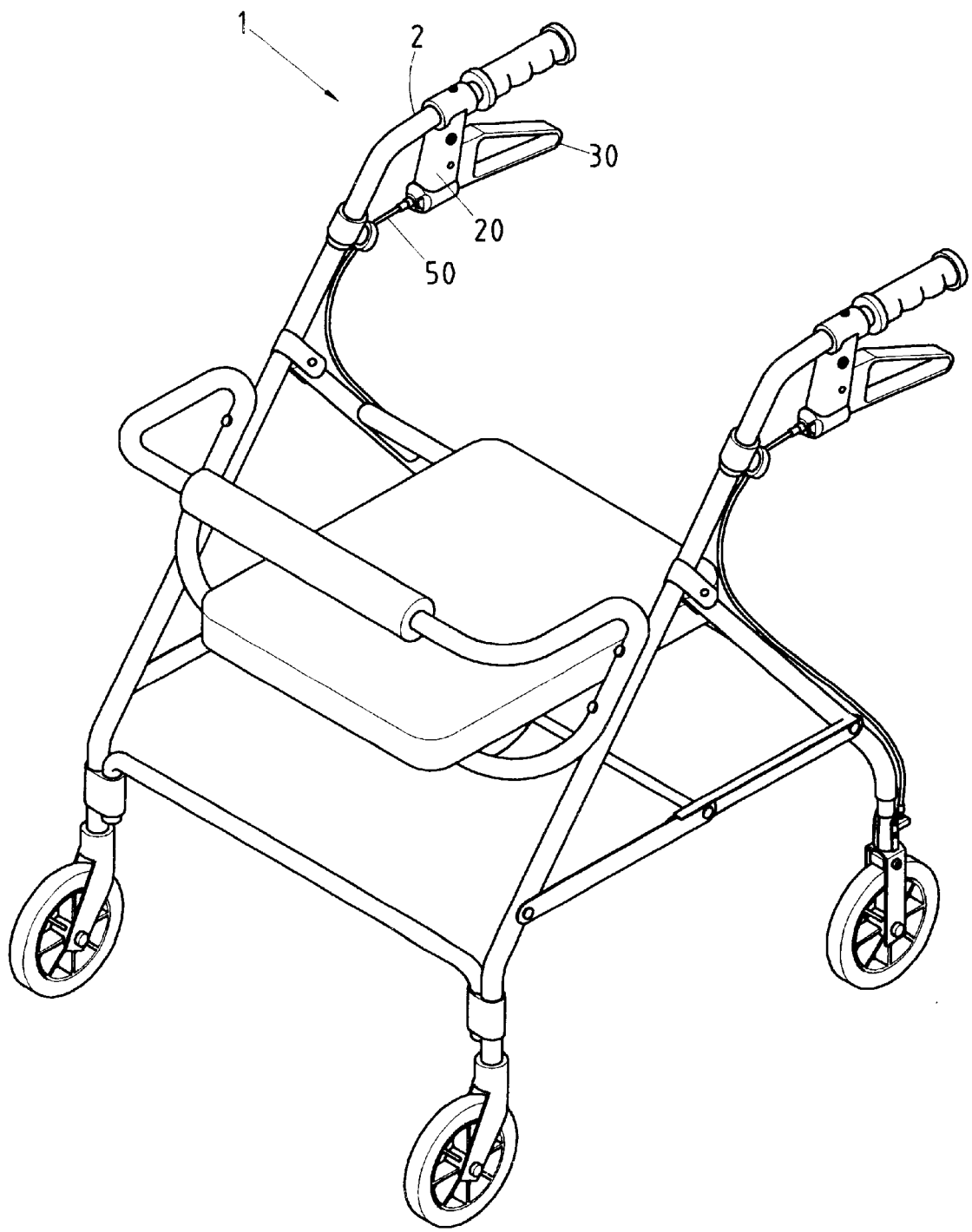
FIG. 2 shows a perspective view of a walking frame provided with a brake control device of the present invention.
Figure 3:
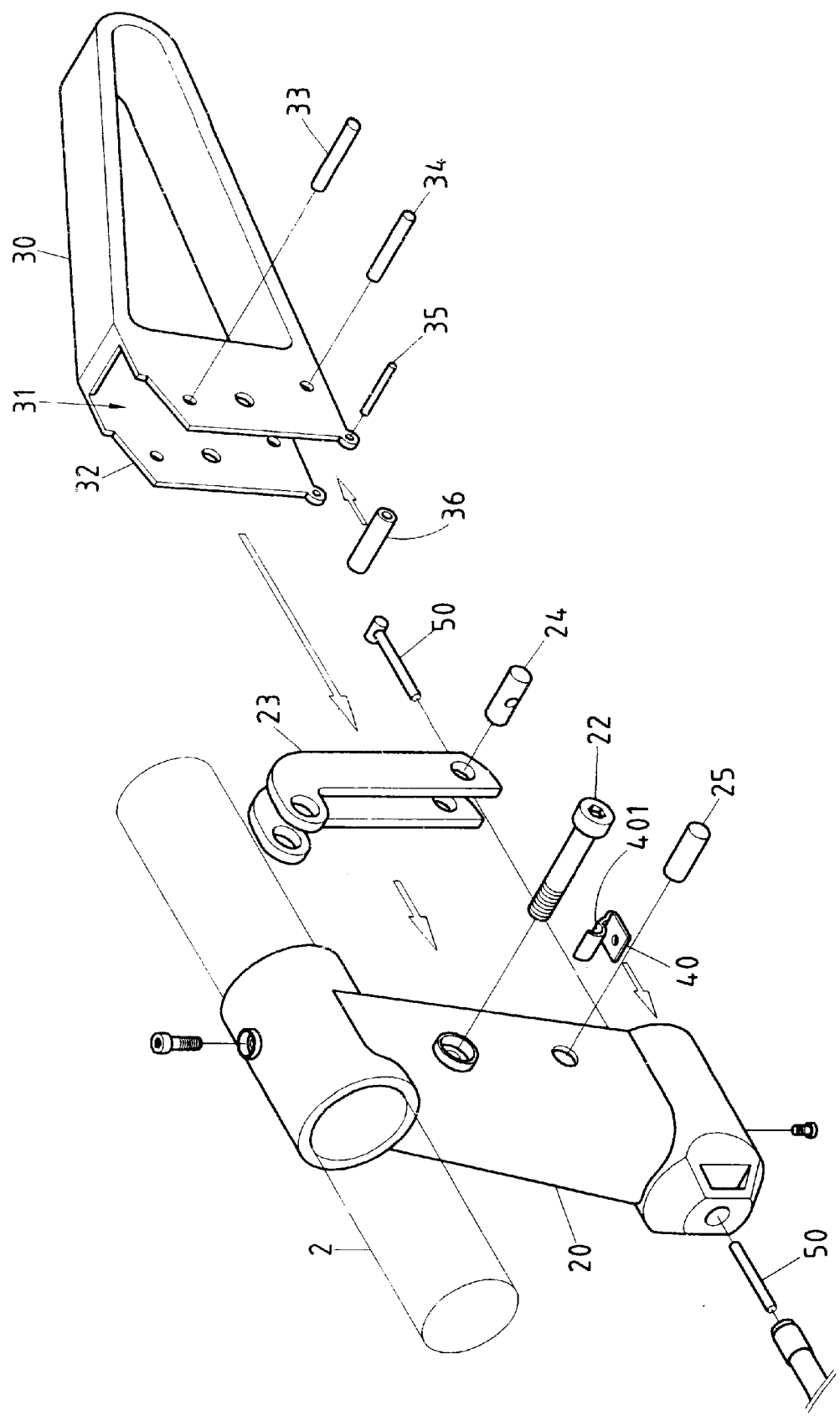
FIG. 3 shows an exploded view of the brake control device of the present invention as shown in FIG. 2.
Figure 4:
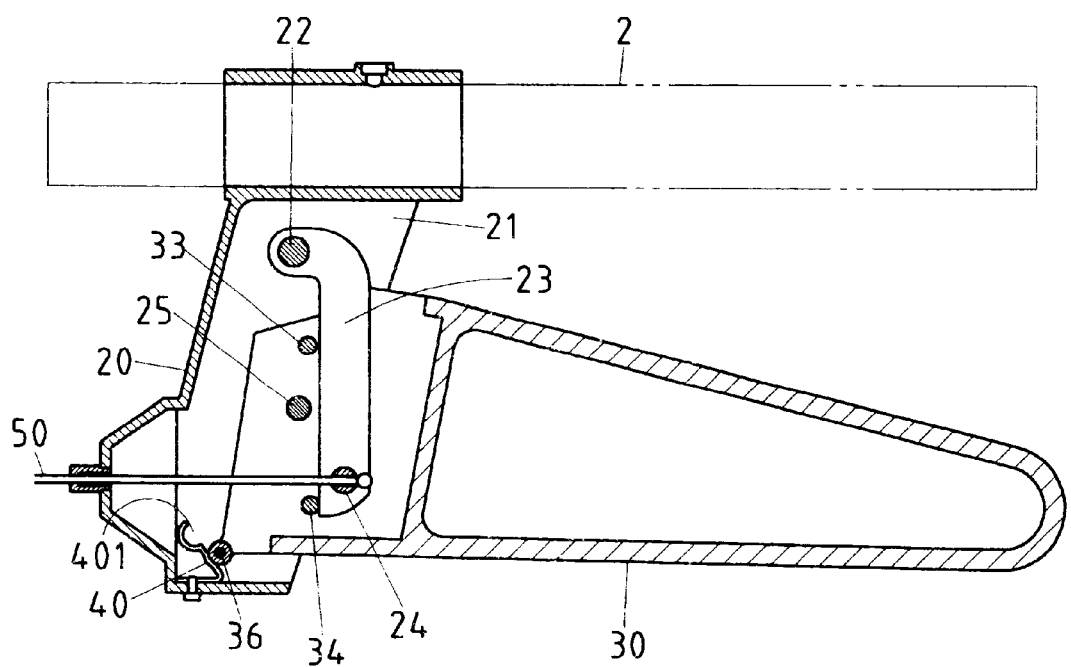
FIG. 4 shows a sectional view of the brake control device of the present invention in an inactive state.

As shown in FIGS. 2–4, a brake control device embodied in the present invention is mounted on a handle 2 of a walking frame 1 which is intended for use by a lame or elderly person as an aid in walking. The brake control device comprises a seat 20 and a control handlebar 30. The seat 20 is fastened at one end thereof to the handle 2. The control handlebar 30 is fastened at one end thereof to the seat 20.

The seat 20 is provided therein with a receiving space 21, a control arm 23 pivotally mounted within the receiving space 21 by a pivot 22, and a stop member 40 located at the bottom of the receiving space 21 and provided with a retaining recess 401. The control arm 23 is provided at the bottom thereof with a bar 24 for fastening one end of a brake cable 50.

The control handlebar 30 is provided at one end thereof with a receiving space 31 which is defined by two side walls 32 having through holes for receiving an upper locating rod 33 and a lower locating rod 34. Located at the bottom of the one end of the control handlebar 30 is a pin 35 for holding a rolling rod 36 between the two side walls 32. The one end of the control handlebar 30 is received within the receiving space 21 of the seat 20 and the control arm 23 is received within the receiving space 31 of the end of the control handlebar 30, and positioned such that the control arm 23 comes in contact with the upper locating rod 33 and the lower locating rod 34. The control handlebar 30 is pivotally attached to the seat 20 by a pivot 25 extending through the two side walls 32.

Figure 5:
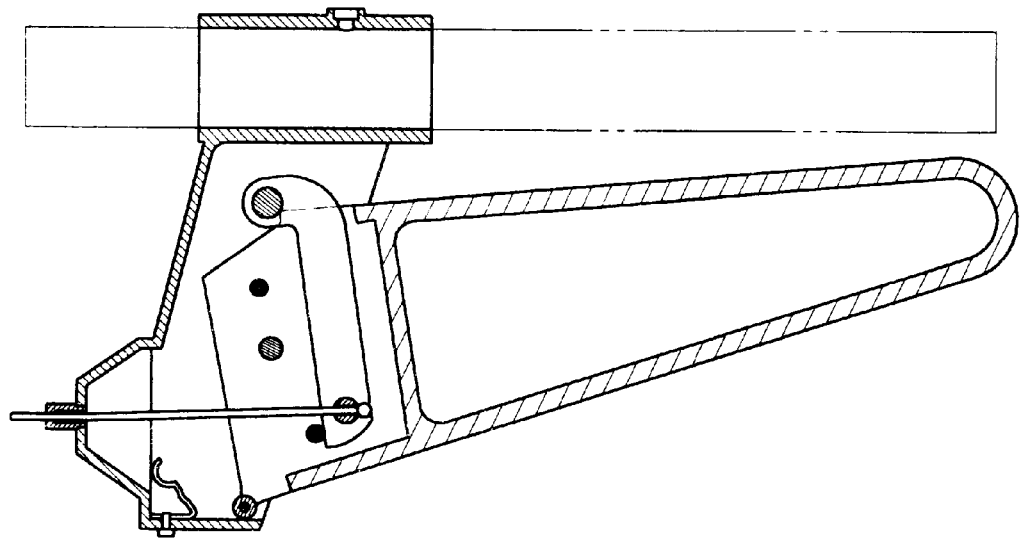
FIG. 5 shows a sectional view of the brake control device of the present invention in action.

The braking action is brought about by moving the control handlebar 30 upward to cause the lower locating rod 34 to actuate the control arm 23 to pivot in a direction toward the handle 2. As a result, the brake cable 50 is pulled to bring about the braking action, as illustrated in FIG. 5.

Figure 6:
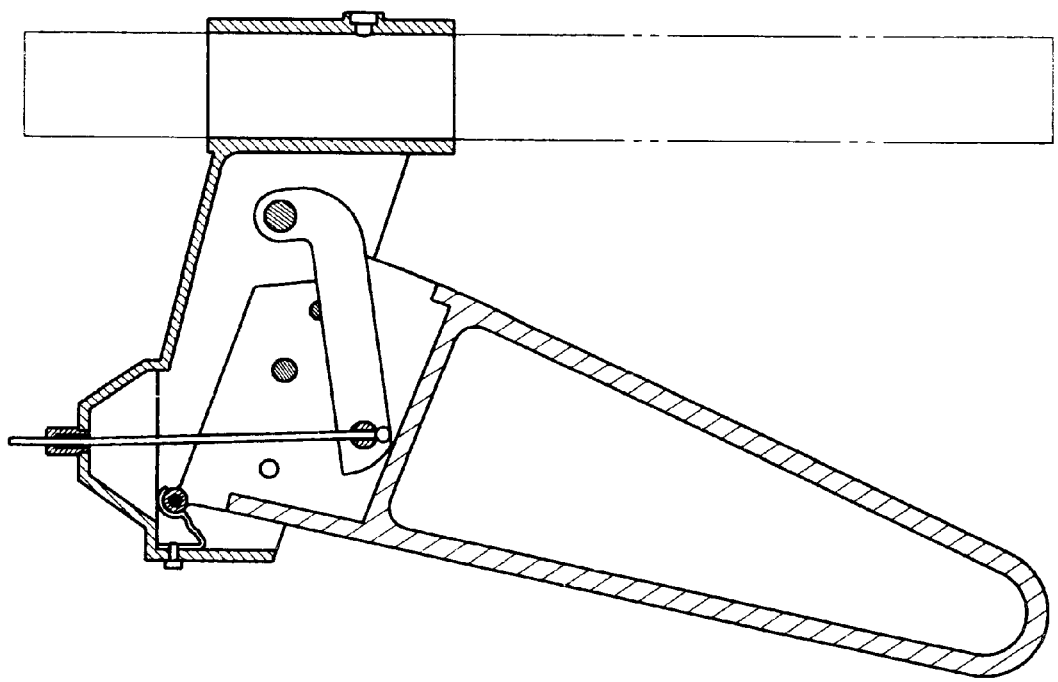
FIG. 6 shows another sectional view of the brake control device of the preferred embodiment of the present invention in action.

As shown in FIG. 6, the braking action can be sustained without having to continously hold the control handlebar 30. This is done by moving the control handlebar 30 in a direction away from the handle 2, thereby forcing the rolling rod 36 of the control handlebar 30 to be retained securely in the retaining recess 401 of the stop member 40. As a result, the control handlebar 30 is stationary. In the meantime, the control arm 23 is pushed by the upper locating rod 33 of the control handlebar 30 to pull the brake cable 50.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

I claim:

1. A brake control device mounted on a handle of a wheeled walker frame for actuating a brake assembly located in the vicinity of a wheel of the walker, said brake control device comprising:

a housing member having an upper end connected to the handle of the walker frame, the housing member having a side opening extending into a cavity portion formed therein, a control arm received within the cavity portion and pivotally attached at an upper end to the housing member, the control arm having a lower end connected to one end of a brake control cable extending into the cavity portion, an opposite end of the brake control cable being connected to the brake assembly for braking the wheel upon pivotal movement of the control arm, and a stop member located at a bottom of the cavity portion and provided with a retaining recess; and a control handlebar provided at one end thereof with a recessed portion defined by two side walls, the recessed portion extending through the side opening of the housing member and received within the cavity portion of the housing member, a pivot pin extending through the two side walls for pivotally connnecting the control handlebar to the housing member, the two side walls having a plurality of through holes for receiving an upper locating rod positioned above the pivot pin and a lower locating rod positioned below the pivot pin, and a supporting pin connected between lower ends of the two side walls for rotatably supporting a roller extending therebetween, the control arm being pivoted by the lower locating rod when the control handlebar is pivoted towards the handle of the walker by a user for temporarily actuating the brake assembly, and the control arm being pivoted by the upper locating rod when the control handlebar is pivoted in a direction away from the handle of the walker by the user and the roller has been positioned within the retaining recess for locking the brake assembly in a brake actuated condition.

* * * * *